United States Patent [19]

Havens et al.

[11] 4,254,916
[45] Mar. 10, 1981

[54] THIN WALL IRRIGATION EMITTER TUBE

[75] Inventors: Glenn G. Havens, La Mesa; Thomas F. McGee, Chula Vista, both of Calif.

[73] Assignee: Bayshore Creative Products, Inc., National City, Calif.

[21] Appl. No.: 931,374

[22] Filed: Aug. 7, 1978

[51] Int. Cl.³ .............................................. B05B 1/20
[52] U.S. Cl. .................................. 239/547; 138/119; 239/567
[58] Field of Search ............... 239/145, 450, 542, 547, 239/567; 138/119, 117, DIG. 8, DIG.11; 264/150, 154–156, 209

[56] References Cited

U.S. PATENT DOCUMENTS

| B 570,382 | 4/1976 | Spencer | 239/547 X |
|---|---|---|---|
| 2,758,735 | 8/1956 | Carter | 138/DIG. 11 X |

*Primary Examiner*—Andres Kashnikow
*Attorney, Agent, or Firm*—Brown & Martin

[57] ABSTRACT

A thin wall irrigation emitter tube is constructed of a generally flat configuration having a plurality of holes in a crease extending along the top of the tubing for distribution from the tubing in vertical spray or streams. The method of forming the tubing includes the forming of a rib or crease along the upper surface in which holes are formed by means of laser or the like so that smearing of the melted tube material during subsequent flattening of the tubing and thereby closing or partially closing of the holes is prevented.

1 Claim, 5 Drawing Figures

THIN WALL IRRIGATION EMITTER TUBE

BACKGROUND OF THE INVENTION

The present invention relates to irrigation and particularly to perforated tubing for drip irrigation and the like.

Due to shortages of water in many parts of the world today, drip irrigation is becoming quite popular. Drip and sprinkler type irrigation is a process wherein water is distributed in controlled amounts to specific plants or areas of plants. This process conserves a considerable amount of water as compared to the flood technique of irrigation.

Some sprinkler and drip irrigation techniques utilize a perforated hose or tubing of a fairly thin wall construction having flexible generally flat configuration such that the tubing can be laid on the ground in a manner such that the perforations or openings in the tubing are vertically oriented.

Such flat tubing normally assumes its flat configuration during the manufacturing process or just after the manufacturing process when it is wound on large drums for storage or transportation. During the manufacturing process, the holes are formed in preferably what would be the upper surface or upper wall of the tubing. When the perforations or openings are formed by a process such as a laser wherein the material is melted during formation of the hole, many of the holes sometimes become closed again due to the engagement of the opposed wall during the winding of the tubing on drums or the like for storage. This is one of the major drawbacks to this technique of manufacturing such tubing.

It is therefore desirable that some means be available for preventing the reclosing and/or partial reclosing of the holes of tubing during the manufacturing process.

SUMMARY AND OBJECTS OF THE INVENTION

Accordingly, it is the primary object of the present invention to overcome the above problems of the prior art.

Another object of the present invention is to provide a method of manufacturing perforated tubing that avoids the reclosing of the perforations during or shortly after the manufacturing process.

A further object of the present invention is to provide a novel thin wall tubing design which prevents reclosing of the perforations therein by means of the tubing wall.

In accordance with the primary aspect of the present invention, a thin wall tubing having a generally flat cross sectional configuration is formed with rib means in the upper wall thereof for supporting the wall portion containing perforations thereof away from the opposing wall of the tubing. The method of forming such tubing includes the formation of a crease in the upper wall of the tubing during the formation process prior to the forming of the perforations.

BRIEF DESCRIPTION OF THE DRAWING

The above and other objects and advantages of the present invention will become apparent from the following description when read in conjunction with the drawings, wherein.

DESCRIPTION OF A PREFERRED EMBODIMENT

Figure 1:
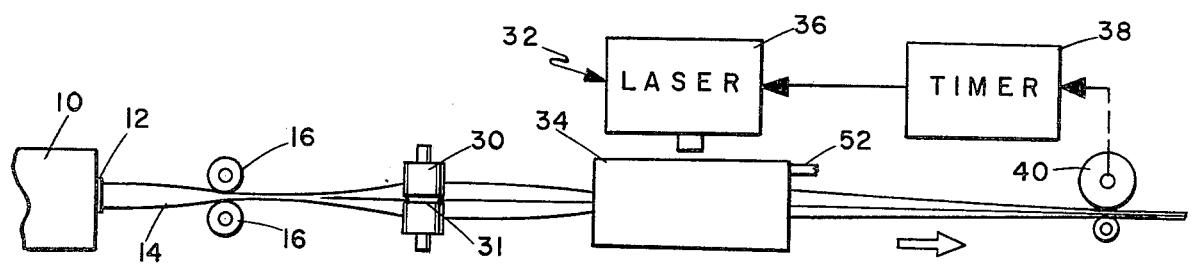
FIG. 1 is an elevational view, schematically illustrating the process of manufacturing in accordance with the present invention.
Figure 2:
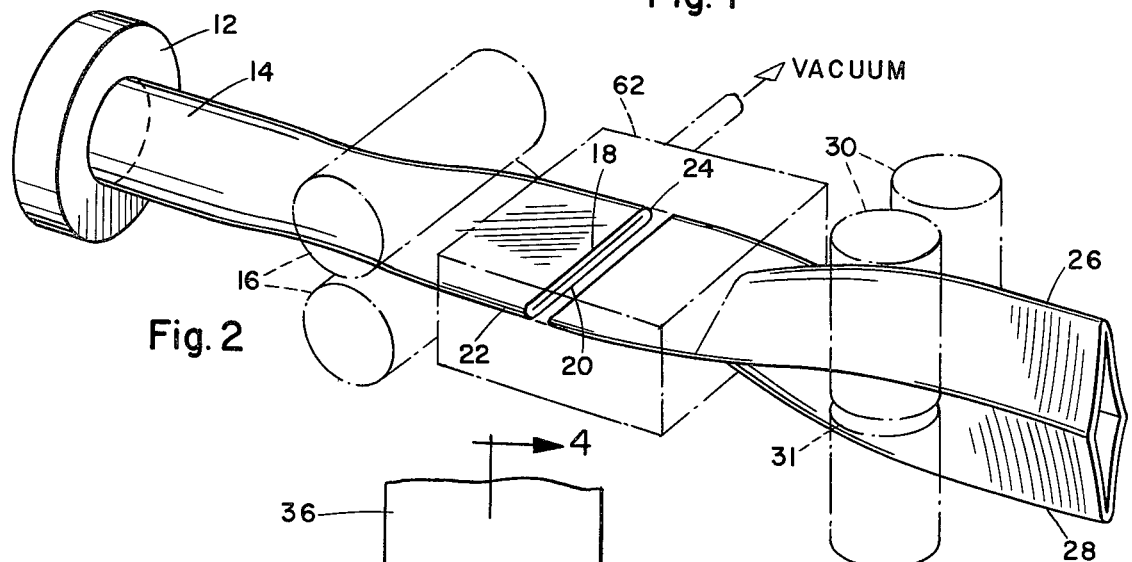
FIG. 2 is a perspective view showing the formation of the tubing in accordance with the process.

Turning to FIG. 1 of the drawing, there is schematically illustrated a set up of machinery for carrying out the process of manufacturing and perforating tubing in accordance with the present invention. The system includes an extruding machine 10 having a tube forming extrusion die 12 from which a thin wall plastic tubing 14 is extruded during the formation thereof. The tubing is fed through a first pair of rollers 16 which roll the tubing in a flat configuration, as shown in FIG. 2. The tubing then has upper and lower opposed flat walls 18 and 20 with side creases 22 and 24 between the walls. The tubing then runs between a second pair of rollers 30 oriented in the vertical direction to form upper and lower creases 26 and 28. The arrangement, of course, can be varied such that the vertical rollers are ahead of the horizontal rollers. The tubing is thus formed to have a generally flat configuration with crease 26 in the upper wall thereof. The second pair of rollers 30 is provided with an annular groove 31 in each roller to receive the side creases 22 and 24 to prevent eliminating them during rolling of the second pair of creases.

In accordance with the primary aspect of the invention, the perforations are formed in this upper crease such that the upper wall, especially the inner surface thereof, is held away from the inner surface of the lower wall of the tubing such that the tubing can be maintained in its generally flat configuration but for the crease, without the lower wall engaging the under surface of the crease portion of the upper wall wherein the openings are formed. With this arrangement, molten material from the formation of the perforations in the tubing is not smeared into the formed openings.

Figure 3:
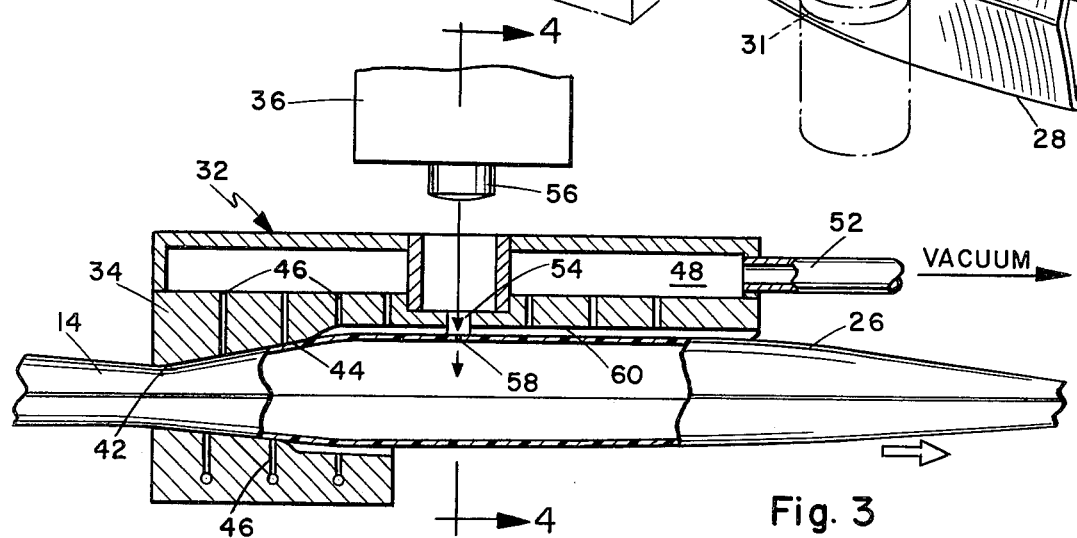
FIG. 3 is a detailed view, partially in section, illustrating the perforation unit.
Figure 4:
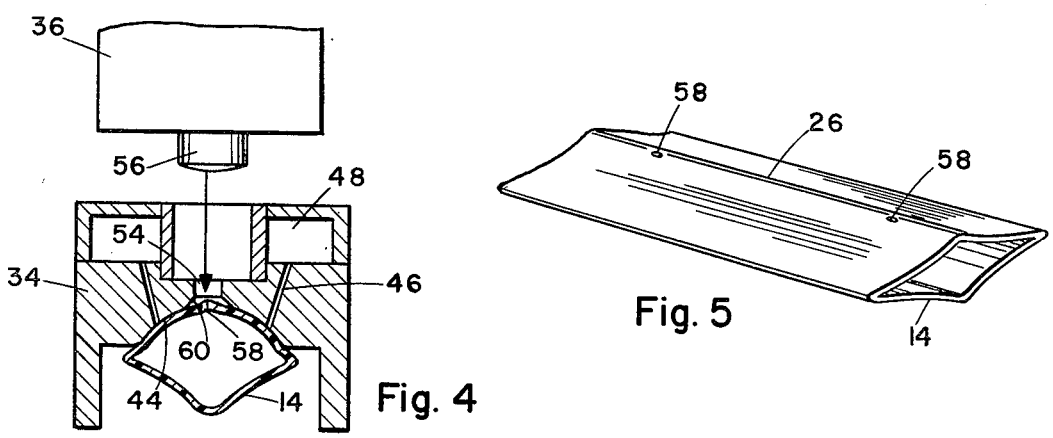
FIG. 4 is a sectional view taken on line 4—4 of FIG. 3.

As best illustrated in FIGS. 1, 3 and 4, the tubing 14 is then fed through a perforating unit designated generally by the numeral 32, having a vacuum chamber or die 34 through which the tubing is forced, and a laser 36 which shoots a beam into the upper wall of the tubing forming a plurality of perforations therein. The location of the perforations is determined by a drive system including a timer 38 and drive or indexing wheels 40, which advance the tubing predetermined distances and then trigger the laser for formation of the perforations. The end of the tubing is then wound on suitable storage drums or reels for shipping and/or storage.

As best seen in FIG. 3, the vacuum die or chamber 34 has an entrance opening 42 of a generally flat configuration for receiving the flat tubing and includes an upwardly expanding generally semicircular die surface 42 having a plurality of vacuum passages 46 communicating with a vacuum chamber 48, which is connected to a suitable source of vacuum by means of a conduit 52. The vacuum die includes a laser opening 54 through which a beam is shot from the barrel 56 of the laser for forming a hole 58 in the upper wall 18 of the tubing 14.

The holes 58 are spaced as above described, a suitable preselected distance determined by a pre-setting of the driving and triggering mechanism of the forming apparatus. A generally V-shaped groove 60 is formed in the upper central portion of the die face 44 for receiving the rib or crease 26 in the upper wall of the tubing during passage through the die. The configuration of the die, as well as the V-groove 60, can assist in aligning the tubing precisely in the die such that the perforations are placed precisely at the side of the upper rib or ridge 26. This arrangement prevents the upper and lower walls or inner surface thereof from coming into contact after passing through the perforating machine 32. Thus, molten material from the perforating process will not be smeared on the under side of the inner wall of the tubing as occurs many times in the prior art techniques of tubing fabrication.

Other forms of the rib or ridge for holding the inside surface of the upper wall 18 from the inside surface of the lower wall are possible within the scope of the invention. For example, a single upper ridge may be formed during the process if the lower rib or ridge 28 is for some reason undesirable. Other forms of spacing means can include ribs, for example, formed on the inner surface of the wall. Other means for holding the perforated portion of the wall away from the inner surface of the lower wall are possible.

Figure 5:
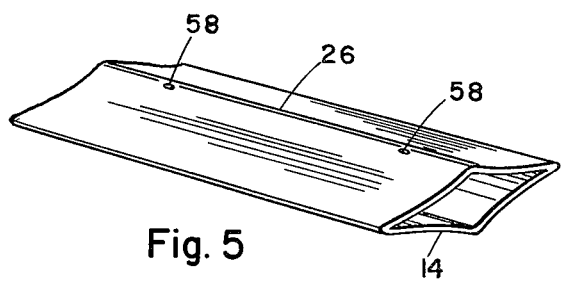
FIG. 5 is a perspective view of a portion of tubing in accordance with the invention.

As best seen in FIG. 5, the tubing as it is completed, has a somewhat diamond shape cross-sectional configuration with the upper wall having perforations therein. The upper wall is spaced from the lower wall during and after the forming process.

In the configuration as shown the holes 58 are preferably located in the wall of the tubing closely adjacent to the peak of the crease so that the hole does not become distorted when the tubing is inflated. When the hole is located precisely in the peak of the crease, it has been found to distort when the tubing is filled with water under pressure.

Other advantages in the construction have become apparent, such as the formation of the crease in the lower wall forming a V-groove becoming the low point in the tubing during operation thereof, such that sediment collects there and reduces the passage of sediment with the water into the perforated openings in the tubing. This construction also maintains an open tubing with a somewhat open flow path along the center line thereof at all times.

These creases have also been found to enhance the stability of the tubing preventing the kinking thereof during handling, such as distributing and laying out of the irrigation system.

During the forming of the creases in the tubing, it may be necessary to use a transition block 62 as shown in phantom in FIG. 2, between the rollers 16 and 30. This block would receive the generally flat tubing and pull it out to a generally round configuration before it passes between rollers 30. The details of transition block 62 are not shown but would be similar to the entrance portion of vacuum die 34, with a generally flat inlet and a generally round outlet.

While the present invention has been disclosed and described by means of a specific embodiment, it is to be understood that numerous changes and modifications may be made therein without departing from the spirit and scope of the invention as defined in the appended claims.

Having described our invention, we now claim:

1. A thin wall irrigation emitter tube comprising:
   an elongated continuous flexible tube of a generally flat configuration defined by upper and lower walls for conducting a fluid therealong and including a plurality of emitter ports formed in and spaced along the upper wall for dispensing said fluid from said emitter ports, and
   a pair of opposed creases formed centrally of and extending longitudinally along the upper and lower walls of said tube, and said ports formed adjacent the crease in the upper wall for maintaining said ports spaced from the lower wall when said tube is rolled flat on a drum or the like.

* * * * *